United States Patent
Aprin et al.

(10) Patent No.: US 10,169,813 B2
(45) Date of Patent: Jan. 1, 2019

(54) CONSOLIDATION PROCESS COMMAND CENTER

(71) Applicant: International Business Machines Corporation, Armonk, NY (US)

(72) Inventors: Morvarid Aprin, Stockholm (SE); Rickard U. Enander, Uppsala (SE); Martin Olsson Wärn, Spånga (SE); Peer M. Törngren, Sollentuna (SE); Lisa F. Walterfeldt, Spånga (SE); Joachim C. Wilsson, Kista (SE)

(73) Assignee: International Business Machines Corporation, Armonk, NY (US)

(*) Notice: Subject to any disclaimer, the term of this patent is extended or adjusted under 35 U.S.C. 154(b) by 383 days.

(21) Appl. No.: 13/740,005

(22) Filed: Jan. 11, 2013

(65) Prior Publication Data

US 2014/0200938 A1 Jul. 17, 2014

(51) Int. Cl.
*G06Q 40/02* (2012.01)

(52) U.S. Cl.
CPC .................... *G06Q 40/02* (2013.01)

(58) Field of Classification Search
CPC ....................................................... G06Q 40/02
See application file for complete search history.

(56) References Cited

U.S. PATENT DOCUMENTS

| | | | |
|---|---|---|---|
| 8,190,992 B2 | 5/2012 | Tien | |
| 8,210,425 B2 | 7/2012 | Clode | |
| 8,782,057 B2* | 7/2014 | Basu et al. | 707/748 |
| 2007/0055596 A1* | 3/2007 | Yankovich et al. | 705/35 |
| 2007/0179872 A1 | 8/2007 | Macalka | |
| 2008/0235249 A1* | 9/2008 | Stephens et al. | 707/100 |
| 2009/0133110 A1* | 5/2009 | Kumar et al. | 726/8 |
| 2011/0066647 A1* | 3/2011 | Chan et al. | 707/770 |
| 2011/0238540 A1 | 9/2011 | Carrington | |

FOREIGN PATENT DOCUMENTS

JP 5006645 B2 8/2012

OTHER PUBLICATIONS

IBM® Cognos® Controller Command Center, "The Command Center," http://publib.boulder.ibm.com/infocenter/cfpm/v10r1m0/index.jsp?topic=%2Fcom.ibm.swg.ba.cognos.ctrl_ug.10.1.1.doc%2Fc_manstatcogr.html.
IBM® Cognos® Controller Command Center, "Filters in the Command Center," http://publib.boulder.ibm.com/infocenter/cfpm/v10r1m0/index.jsp?topic=%2Fcom.ibm.swg.ba.cognos.ctrl_ug.10.1.1.doc%2Fc_c4filter.html.

(Continued)

*Primary Examiner* — Sujay Koneru
(74) *Attorney, Agent, or Firm* — Anthony V. S. England; Reza Sarbakhsh

(57) ABSTRACT

For a financial consolidation process, user input is received defining financial consolidation tasks for business entities and the tasks are associated with respective roles. The roles are assigned to persons who are responsible for completion of tasks associated with their respective roles. A graphical user interface is presented providing control elements and task icons representing the financial consolidation tasks for the business entities, including presenting a visual feature of each icon indicating status of each icon's respective task. Responsive to receiving a user input from a user control element for a selected task icon, identification is shown for a person assigned to the task of the selected task icon.

20 Claims, 12 Drawing Sheets

(56) References Cited

OTHER PUBLICATIONS

IBM® Cognos® Controller Command Center, "Sending a Notification Email," http://publib.boulder.ibm.com/infocenter/cfpm/v10r1m0/index.jsp?topic=%2Fcom.ibm.swg.ba.cognos.ctrl_ug.10.1.1.doc%2Ft_c4senemail.html.

"IBM Cognos Controller V10.1.1 delivers the timely, accurate information that finance organizations need for regulatory compliance, planning, analysis, and performance management," IBM United States Software Announcement 212-170, dated Jun. 5, 2012.

"How to: Filter Data in a ReportViewer Report," http://msdn.microsoft.com/en-US/library/ms252125(d=printer,v=vs.80), 2012 Microsoft.

\* cited by examiner

CONSOLIDATION PROCESS COMMAND CENTER

BACKGROUND

A financial consolidation, that is, a consolidation of financial statements, is performed when a parent company owns at least one other company. A financial statement normally includes a profit and loss statement, a balance sheet, and a cash flow. At the end of each period, such as daily, weekly, monthly, quarterly, year-end, or any other arbitrary time span, the books are closed for all group companies and then consolidated to one financial statement. The consolidation process may include some mandatory adjustments, such as translation of foreign subsidiaries, elimination of inter-company transactions, minority calculations, and eliminations of shares in subsidiaries.

The consolidation process is critical, since it is imperative that top-level (corporate) numbers are reported on time each period end. In large corporations with complex reporting structures, the challenge to close books in the shortest time possible is significant. Meeting the period deadline is critical, in many cases legally required.

SUMMARY

According to embodiments of the present invention, a method for a financial consolidation process includes receiving user input defining financial consolidation tasks for business entities, associating the tasks with respective roles and assigning the roles to persons who are responsible for completion of tasks associated with their respective roles. A graphical user interface is presented providing control elements and task icons representing the financial consolidation tasks for the business entities, including presenting a visual feature of each icon indicating status of each icon's respective task. Responsive to receiving a user input from a user control element for a selected task icon, an identification is shown for a person assigned to the task of the selected task icon.

In another aspect, only a selected set of the task icons is shown responsive to receiving a user input from a filter control element for selecting among all the tasks. An action for the tasks of the selected set of the task icons is performed responsive to receiving a user input from an action control element.

In another aspect, performing the action includes sending communications to the persons responsible for the tasks of the selected set of the task icons.

In another aspect, presenting a graphical user interface providing control elements comprises showing a plurality of filter control elements for selecting among all the tasks, wherein ones of the filter control elements are business entity filter control elements and ones of the filter control elements are task filter control elements, each task filter control element being associated with a respective task status category. Further, the method comprises showing on the grid of task icons only a selected set of the task icons responsive to receiving user inputs from ones of the plurality of filter control elements, including receiving a user input selecting tasks associated with user-selected business entities via at least one of the business entity filter control elements and receiving a user input selecting tasks having a user-selected task status via at least one of the task filter control elements and responsively showing in the selected set of the task icons only task icons for the user-selected business entities and that have the user-selected task status.

In another aspect, ones of the filter control elements are person filter control elements. On the grid of task icons only a selected set of the task icons is shown responsive to receiving user inputs from ones of the plurality of filter control elements comprises receiving a user input selecting tasks associated with persons via at least one of the person filter control elements and responsively showing in the selected set of the task icons only task icons for the user-selected business entities and that have the user-selected task status and that are for the selected persons.

In another aspect, the method includes showing how many business entities have a respective task status category for each respective business entity filter control element.

In another aspect, the method includes showing how many tasks have a respective task status category for each respective task filter control element.

In other forms of the invention, a computer program product and systems are provided.

BRIEF DESCRIPTION OF THE DRAWINGS

Novel features believed characteristic of the invention are set forth in the appended claims. The invention itself, however, as well as a preferred mode of use, further objectives and advantages thereof, will best be understood by reference to the following detailed description of one or more illustrative embodiments when read in conjunction with the accompanying drawings, wherein:

DETAILED DESCRIPTION

Figure 1:
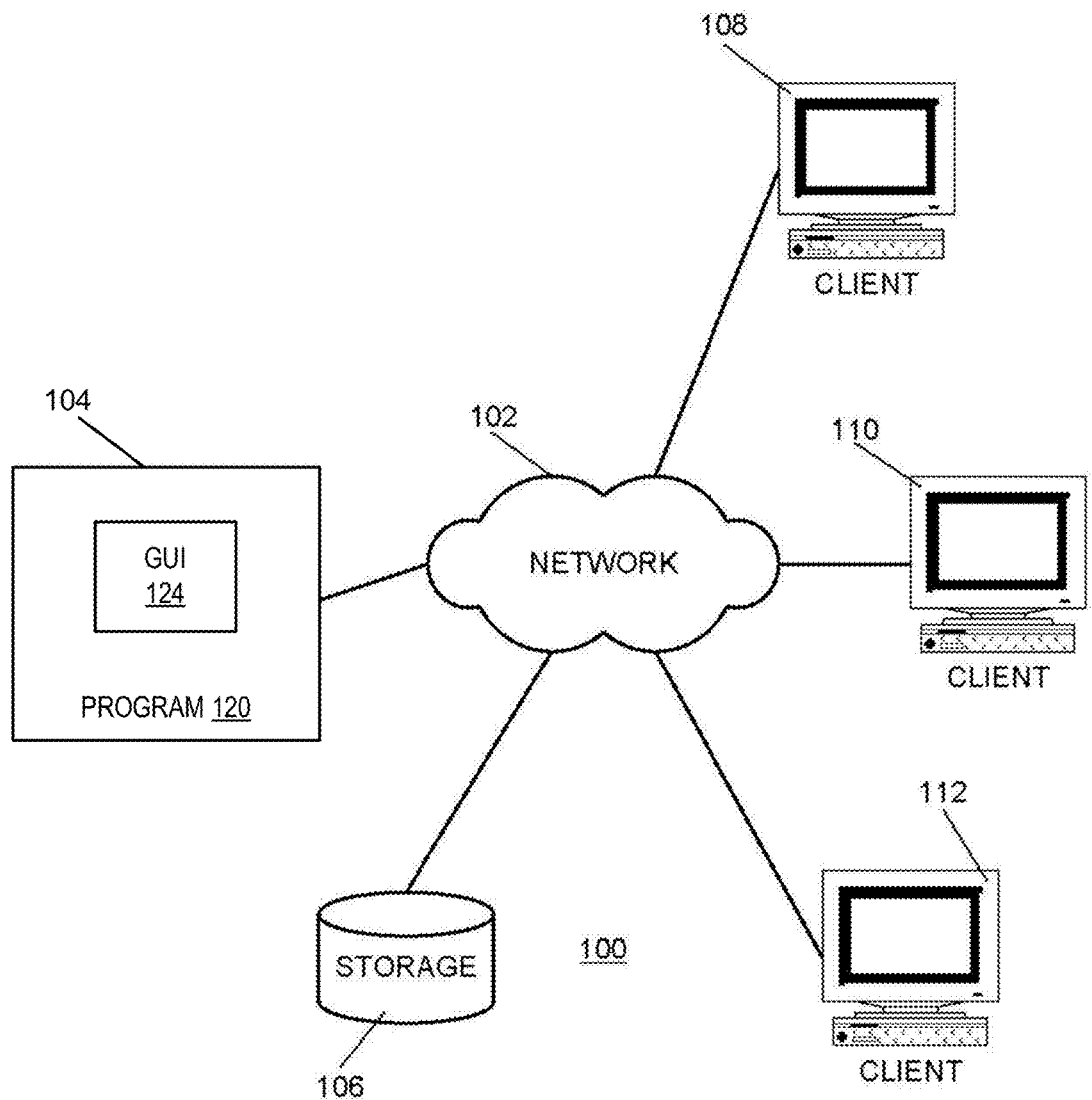
FIG. 1 depicts a pictorial representation of a network of data processing systems in which embodiments of the invention may be implemented.

Descriptions of various embodiments of the invention are herein presented for purposes of illustration, but are not intended to be exhaustive or limited to the embodiments disclosed. Many modifications and variations will be apparent to those of ordinary skill in the art without departing from the scope and spirit of the described embodiments.

Terminology used herein was chosen to best explain the principles of the embodiments, the practical application or technical improvement over technologies found in the marketplace, or to enable others of ordinary skill in the art to understand the embodiments disclosed herein.

For many groups, consolidation is an iterative process, reviewing, adjusting and reconciling before obtaining final results. The process is cooperative, to be performed by a potentially large number of contributors with complex interdependencies. A group cannot report its number unless all its children have reported theirs. The process is monitored at several steps and levels in the reporting hierarchy. A large number of reporting sites are responsible for reporting reconciled data in a timely manner, and each "owning entity" (group or subgroup) is responsible for reconciling, consolidating and reporting numbers further up the chain.

Meeting each period's deadline is critical, in many cases legally required. To minimize risk of delays and detect problems early, all actors (and especially controllers at corporate headquarters) need a quick overview of the current process status; are all forms filled out, are all tasks completed, are any companies running late? A clear understanding of the progress and the ability to quickly address any problems that arise are crucial.

Embodiments of the present invention involve recognition that current consolidation products and methods do not provide a comprehensive overview combined with a quick and easy way to take necessary actions to complete a financial consolidation. It is tedious and time consuming to take manual actions such as printing a report from a financial reporting system, analyzing details of the printed report, and typing emails to alert responsible users of reporting issues or going back into the system to take necessary actions.

In embodiments of the present invention, a consolidated process command center program enables production of consolidated financial statements at the end of each reporting period for a business entity that itself includes additional business entities, which may also be referred to as sub-entities. This includes providing a consolidation process overview, where status of the process is in focus. This overview is interactive and not just a report, wherein an overview interface presents the user with features for user selection of relevant actions to address reporting issues such as running selected reconciliation reports, marking selected tasks to indicate as irrelevant for selected companies, manually entering data in selected submission forms, or sending email reminders to users responsible for selected tasks of selected companies. Embodiments provide a grid of business entities and tasks involved in a consolidation process and provide multiple icon push buttons to filter grid data, where the push buttons are associated with counts of tasks by type. This improves the user's ability to easily filter using a substantial number of criteria.

Referring now to FIG. 1, a pictorial representation of a network of data processing systems (also referred to as "computer systems") is depicted in which embodiments of the invention may be implemented. Network data processing system 100 is a network of computer systems in which embodiments of the invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, one of the computer systems, server 104, is connected to network 102 along with storage unit 106. In addition, other computer systems, clients 108, 110, and 112, are depicted and are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another.

At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for embodiments of the invention.

Figure 2:
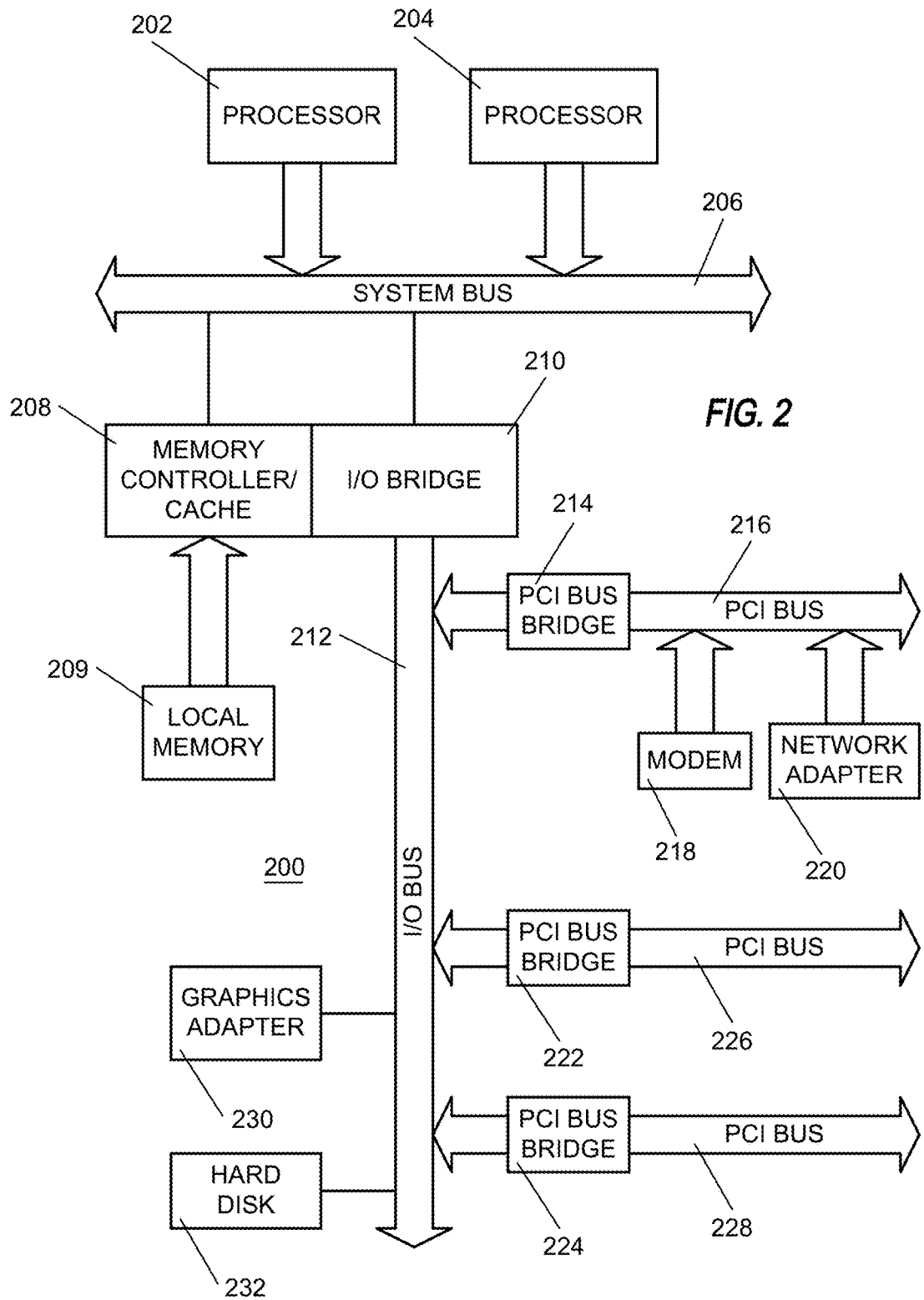
FIG. 2 is a block diagram of a data processing system that may be implemented as a server in which embodiments of the invention may be implemented.

Referring to FIG. 2, a block diagram of a data processing system that may be implemented as a server, such as server 104 in FIG. 1, is depicted in accordance with embodiments of the invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to network computers 108, 110 and 112 in FIG. 1 may be provided through modem 218 and network adapter 220 connected to PCI local bus 216 through add-in boards. Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to embodiments of the invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Server 104 may provide a suitable website or other internet-based graphical user interface accessible by users to enable user interaction for aspects of an embodiment of the invention. In one embodiment, Netscape web server, IBM Websphere Internet tools suite, an IBM DB2 for Linux, Unix and Windows (also referred to as "IBM DB2 for LUW") platform and a Sybase database platform are used in conjunction with a Sun Solaris operating system platform. Additionally, components such as JBDC drivers, IBM connection pooling and IBM MQ series connection methods may be used to provide data access to several sources. The term webpage as it is used herein is not meant to limit the type of documents and programs that might be used to interact with the user. For example, a typical website might include, in addition to standard HTML documents, various forms, Java applets, JavaScript, active server pages (ASP), Java Server Pages (JSP), common gateway interface scripts (CGI), extensible markup language (XML), dynamic HTML, cascading style sheets (CSS), helper programs, plug-ins, and the like.

Figure 3:
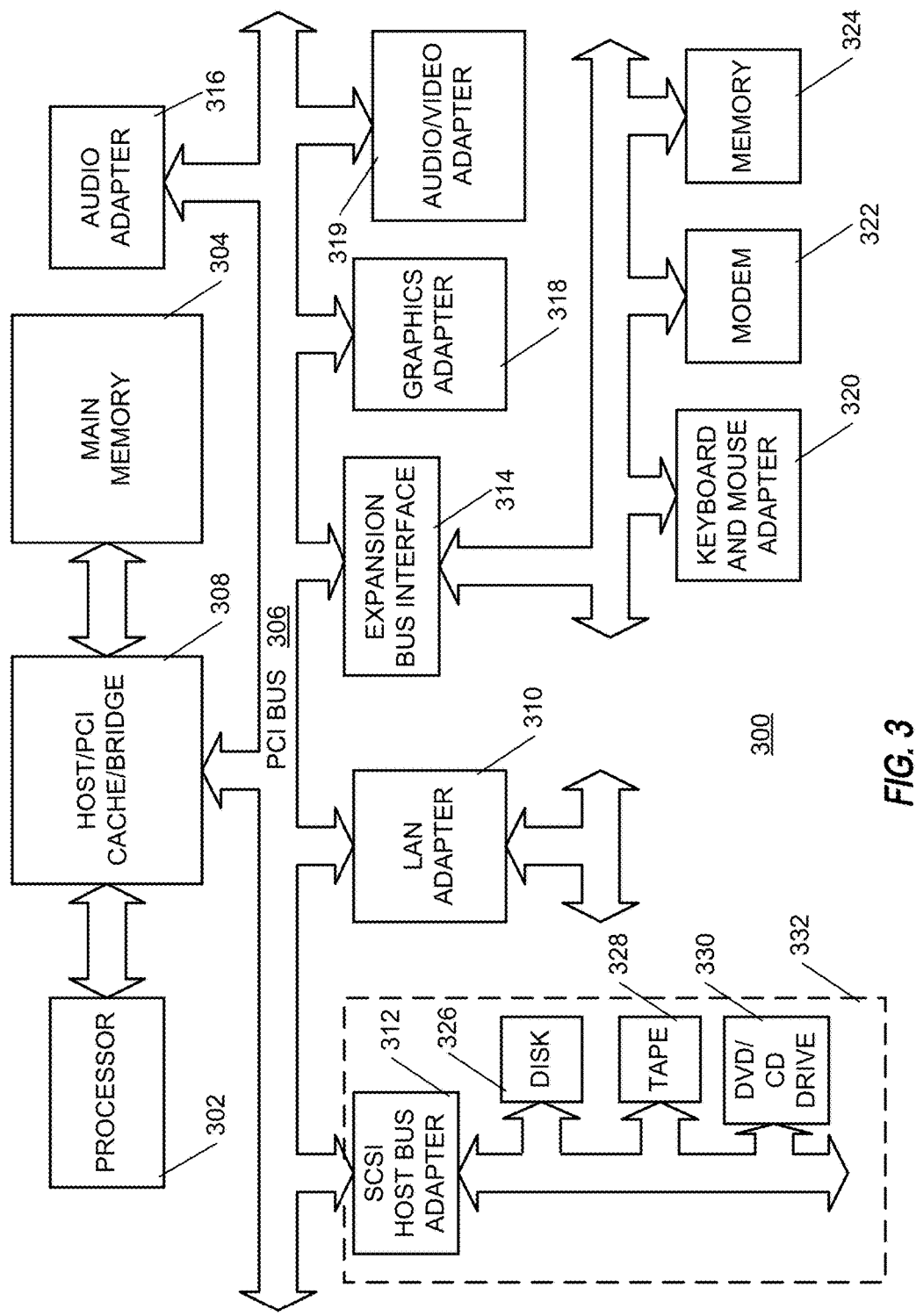
FIG. 3 is a block diagram illustrating a data processing system in which embodiments of the invention may be implemented.

With reference now to FIG. 3, a block diagram illustrating a data processing system is depicted in which embodiments of the invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, Small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots.

Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as a Windows operating system, which is available from Microsoft Corporation. ("Windows" is a trademark of Microsoft Corporation.) An object oriented programming system such as Java may run in conjunction with the operating system and provide calls to the operating system from Java programs or programs executing on data processing system 300. ("Java" is a trademark of Sun Microsystems, Inc.) Instructions for the operating system, the object-oriented operating system, and programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of embodiments of the invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 may also be a notebook computer or hand held computer as well as a PDA. Further, data processing system 300 may also be a kiosk or a Web appliance. Further, embodiments of the invention may reside on any data storage medium (i.e., floppy disk, compact disk, hard disk, tape, ROM, RAM, etc.) used by a computer system. (The terms "computer," "system," "computer system," and "data processing system" and are used interchangeably herein.

With reference now to FIGS. 1 and 4, aspects of a consolidated process command center program and its operation are illustrated, according to embodiments of the invention. In one or more embodiments, the consolidated process command center program may be implemented, at least in part, by features of IBM Corporation's COGNOS™ program. Consolidated process command center program 120 running on a computer system 104 provides a graphical user interface (GUI) 124 to a current user. Program 120 receives data input from users, which may include receiving forms and journals or the like (or status information regarding forms and journals or the like), also known as "tasks" or "submissions," where a group of tasks may be referred to herein as a "submission." Actions in the consolidation process are often grouped in several submissions, where the first submission includes fundamental tasks that are prerequisites for tasks in subsequent submissions. Submissions follow a chronological sequence, whereas tasks within a submission don't. Submissions are submitted over time and are typically repeated during each period, although they are not necessarily the same for each reporting period. Some submissions need to be completed before others, although they may not necessarily have to be submitted in sequence, because they may be submitted when only partially complete. Program 120 receives a submission's state of completeness from a user who submits it and presents this status information to a current user who is reviewing the submission via GUI 124.

Program 120 presents a first view 400, which provides a comprehensive overview of companies 410 (in rows) to a current user via graphical user display 124, according to embodiments of the present invention. (Although companies 410 are shown and referred to herein, it should be appreciated that program 120 and view 400 are applicable to business entities of any form, and not just companies.) Program 120 presents tasks in columns 430. Thus, a row 410 corresponds to a company or group of companies and may be referred to herein as company 410 or row 410. Likewise, a column 430 corresponds to a task performed by the companies (or by an authorized user at a parent group) and may be referred to herein as a task 430 or a column 430.

View 400 shows columns of tasks 430 labeled to indicate task types. In the illustrated instance, these include "JW1," another labeled "JW3," etc. and, finally, a last column labeled "PL." This indicates that a first set of tasks 430 is listed in the column labeled "JW1," a second set of tasks 430 is listed in the column labeled "JW3," etc. ("JW1", JW3" and "PL" refer to customer-defined tasks. Tasks are typically named to indicate the type of task and further described in a task definition. In this example, JW1 and JW3 may represent manual journals and PL may represent a Profit/ Loss form).

As shown, view 400 is a group view in which program 120 presents rows 410 of companies in a hierarchal tree structure 420 according to groups in which the companies belong. For example, in view 400 company 5300 (a name of which is partially shown as "Abno . . . vestment AV," wherein the name is abbreviated due to column width) is shown in a row of companies 410 immediately below group 1000 ("Frango Group") and connected to group 1000 by a horizontal line branching off a vertical root that extends down from group 1000. This indicates that company 5300 is a child of group 1000. Note also that in the illustrated example, group 5000 ("Fran . . . ment Group") is also a child of group 1000, as also indicated by a branch off of the root. Further, company 5300 is a child of group 5000, as indicated by a vertical root extending downward from group 5000 with a branch to company 5300 extending horizontally from the group 5000 root. Thus, company 5300 is shown twice in group view 400, once as a child of group 1000 and once as a child of group 5000 and, thus, as a grandchild of group 1000. This is because the company 5300 is partially owned by both parents in this example, and consequently needs to report its numbers to two owners.

Program 120 presents cells in view 400, which are at the respective intersections of company rows 420 and task columns 430. Each cell of view 400 shows current status of a specific task 430 for the cell's associated company 410, optionally showing who is responsible for completing the task and other information. For example, the cell in the JW1 task column for company 5300 indicates that the JW1 task for company 5300 is missing. In the illustrated instance, this is indicated by the word "missing" and also by the type of icon that is beside the word. The "missing" icon has the appearance of a document with a small open box overlaying part of the document icon in the upper left-hand corner. The cell in the JW1 task column for company 1100, for example, indicates that the JW1 task for company 1100 is reported, i.e., the journal related form has been submitted. The "reported" icon has the appearance of a document with a small, solid circle overlaying part of the document icon in the upper left-hand corner. The cell in the JW1 task column for company 2200, for example, indicates that the JW1 task for company 2200 is not applicable, The "not applicable" icon has the appearance of a document and has a small, open circle with the universal "not" symbol striking through the circle (diagonal hash mark), which overlays part of the document icon in the upper left-hand corner. (It should be appreciated that the words such as missing, reported, etc. may be omitted without loss of information, since the unique icons convey the status information all by themselves. Furthermore, it should be appreciated that the icons may be of different shapes or colors, so that the distinctions among them stand out more prominently.)

Further, program 120 presents an icon beside each company 420 name in each row, where the icon is configured to show collective status of all the tasks 430 for that company. For example, the icon for company 5300 is an open box because all the tasks 430 for this company are missing (i.e., the company status is "Missing"). The icon for company 5301 is a partly filled in box (i.e., the company status is "In progress") because one of the tasks, namely the task JW6, has been marked as not applicable. Likewise, the icon for company 1100 is partly filled in. In this case, that is because the status of one of the tasks is "reported," namely task JW1.

Program 120 allows a user to define a role for a company or task and allows the assignment of users to roles for each company. Thus, for a task that is assigned to a particular role for a particular company, program 120 allows the consolidation program 120 user to direct the task to the user assigned to that role for that company. Each company may have an assigned default role, which program 120 uses for all tasks where no specific role is assigned.

Also, program 120 presents additional information about a cell responsive to the user hovering a mouse cursor over the cell. In the illustrated instance, program 120 presents details of the cell for the JW5 task of company 2520 ("Frango GmbH") in this fashion. The details shown in this instance include the following:

"JW5—VALIDATION" is the full name (code and name) of the task.

"2520—Frango Gmbh" is the full name (code and name) of the company.

"DEM" is the local currency used at this company (Deutsche Mark).

"1- STEST" is the full name of the submission and the deadline when it needs to be completed (in this case an obfuscated name in a test. database). The submission will be the same for all cells, and is also reflect in the abbreviated dialog caption (the last "1" indicates submission 1)

"R2—ΔRoll 2 (default)" is the role defined for performing this task.

"ADM" is the physical user assigned to perform this role at this company, consequently the user that is responsible for performing this task on behalf of this company.

Program 120 provides a filter section 440 at the top of view 400. One filter 460 allows the user to select a subset of companies (i.e., companies typed in the text box or selected from a drop down list or popup dialog, which appears responsive to the user clicking the rectangular icon for filter 460). One group of filters in section 440, i.e., filters 441, 442, 451 and 452, concern status of reporting by total numbers of companies according to various respective status types. Another group in section 440, i.e., filters 443-445, concern status of reporting by total numbers of tasks, also according to various respective status types. Also, filter 462 in section 440 provides a selected-user filter for tasks assigned to one or more specific users (i.e., users selected from a drop down list or popup dialog, which appears responsive to the user clicking the rectangular icon for filter 462). Selecting filter 446 presents tasks assigned to the current user, i.e., the user who is viewing view 400.

More specifically, regarding buttons in filter section 440 for filtering by company, filter button 441 is configured to select (for displaying in a view) companies having a status wherein all reporting is missing, filter button 442 is configured to select companies having a status of "in progress," i.e., companies for which some tasks have been submitted, filter button 451 is configured to select companies having a status of "Reconciled," and filter button 452 is configured to select companies having a status of "Ready."

Regarding buttons in filter section 440 for filtering by task, filter button 443 is configured to select tasks that are missing, filter button 444 is configured to select tasks that are N/A (i.e., not applicable), filter button 445 is configured to select tasks that are reported.

In the illustrated instance shown in FIG. 4, no filters in filter section 440 are applied. Program 120 compiles task status and presents numbers indicating how many companies have tasks in each respective category associated with each respective company filter button 441, 442, 451 and 452, how many tasks are in each respective category associated with each respective task filter button 443-445, and how many tasks are associated with the current user button 446 in view 400, as illustrated.

In the instance shown, regarding the buttons for filtering by company, program 120 presents a number on filter button 441 showing that there are 12 companies with status "Missing," a number on filter button 442 showing that there are 7 companies with status "In progress," a number on filter button 451 showing that there are no companies with status "Reconciled," and a number on filter button 452 showing that there are no companies with status "Ready." The number of companies "in progress" is shown as "7" since this refers to the number of unique companies or groups carrying this status. In this view, there are a total of 10 companies and groups with status in progress, but three of these (2520, 5200, 5301) are shown twice. Pressing the filter for "In Progress" will yield a flat view with 7 rows.

Regarding the buttons for filtering by task, program 120 presents a number on filter button 443 showing that there are 53 tasks with status "Missing," a number on filter button 444 showing that there are 3 N/A tasks, a number on filter button 445 showing that there are 3 Reported tasks, and a number on filter button 446 showing that the current user has 7 tasks.

"Current user" filter 446 selects all tasks assigned to the current user and works as a logical AND with all other filters. Clicking current user filter 446 disables selected user filter 462. Likewise, clicking selected-user filter 462 (and selecting one or more users to associate with filter 462) works as a logical AND with other filters (the selected users are logically OR'ed) and disables current user filter 446. For instance, selecting task status filter "Missing" 443 and applying user filter 462 to select users "johndoe" and "janedoe" will yield a view with tasks that have status "Missing" AND where user johndoe OR user janedoe are responsible.

As should be appreciated from the above description, according to embodiments of the present invention, program 120 receives input from a current user via the user selectable, one-click filters in filter section 440 and the query boxes 460 and 462, wherein user selection of one of more of filter buttons 441-446 or filter criteria in query boxes 460 or 462, causes program 120 to present data to the current user in updated versions of view 400 that are specific to the current user, particular users or to particular companies or tasks. Program 120, for example, may present data about companies that are not yet ready, i.e., companies having tasks that are not yet completed. Further, program 120 may also further reduce the output based on named companies or users via query boxes 460 and 462, which further constrains the filtered result by selecting matching rows and cells of the responsible users or companies. Responsive to receiving one-click filter or query box input (which may include both forms of input) for selecting a subset of tasks and companies, program 120 presents the selected subsets that match the filter selections and queries via GUI 124.

Upon receiving the filter section 440 and query box 460 and 462 input from the current user and responsively presenting the selected combination of tasks 430 and companies 420 in updated GUI 124 view of view 400 (such as, for example, a view 500 as described for FIG. 5 herein below, or a view 600 as described for FIG. 6 herein below, etc.), program 120 may receive user input for further actions that may apply collectively to all the selected tasks 430 for the selected companies 420 that are presented in the updated view, or to the tasks of selected ones of the companies 420 in the updated view or only to selected ones of the tasks 430 in the updated view, depending upon user input.

One way that program 120 enables users to apply further actions is for program 120 to receive user selection of tasks (cells), such as by a user positioning a mouse cursor on some cell and left-clicking the mouse (repeated with shift or ctrl key to select multiple cells). Program 120 then opens a context menu (not shown) for all selected cells responsive to receiving another user action for the selected cells, such as by receiving a right-click of the mouse. Then program 120 presents actions for the user to select for the task or tasks on the context menu, such as by presenting buttons, check boxes or the like. The context menu actions include running a reconciliation report for the selected tasks, marking the selected tasks (such as to indicate them as not applicable), manually entering data in submission forms, or sending an email reminder to users responsible for the selected tasks, according to embodiments of the present invention.

Program 120 also provides other ways for the user to select actions for tasks. For example, "send email" is an action that may applies to all or selected cells in the rows and columns (filtered or unfiltered) and is launched through button 690 on the right-hand side of view 400. This action is described further herein below.

Other buttons shown (from top to bottom, but skipping button 690) on the right hand side of view 400 are:
- select visible columns (show/hide columns)
- refresh (reload all status from database)
- show responsible users (toggle cell text between showing status and user names)
- toggle icons on/off (toggle cell display: show or hide icons for task status)

Thus, program 120 provides a user with a minimalist but comprehensive overview of current status. Further, responsive to receiving clickable filter selection(s) 441-446 or selection in query boxes 460 and 462 from a user, program 120 presents the user with relevant actions to select in association with each status item in a filtered view 400. Thus, program 120 enables a user to "zoom in" on relevant data using an intuitive combination of filtering in the filter groups.

Figure 4A:
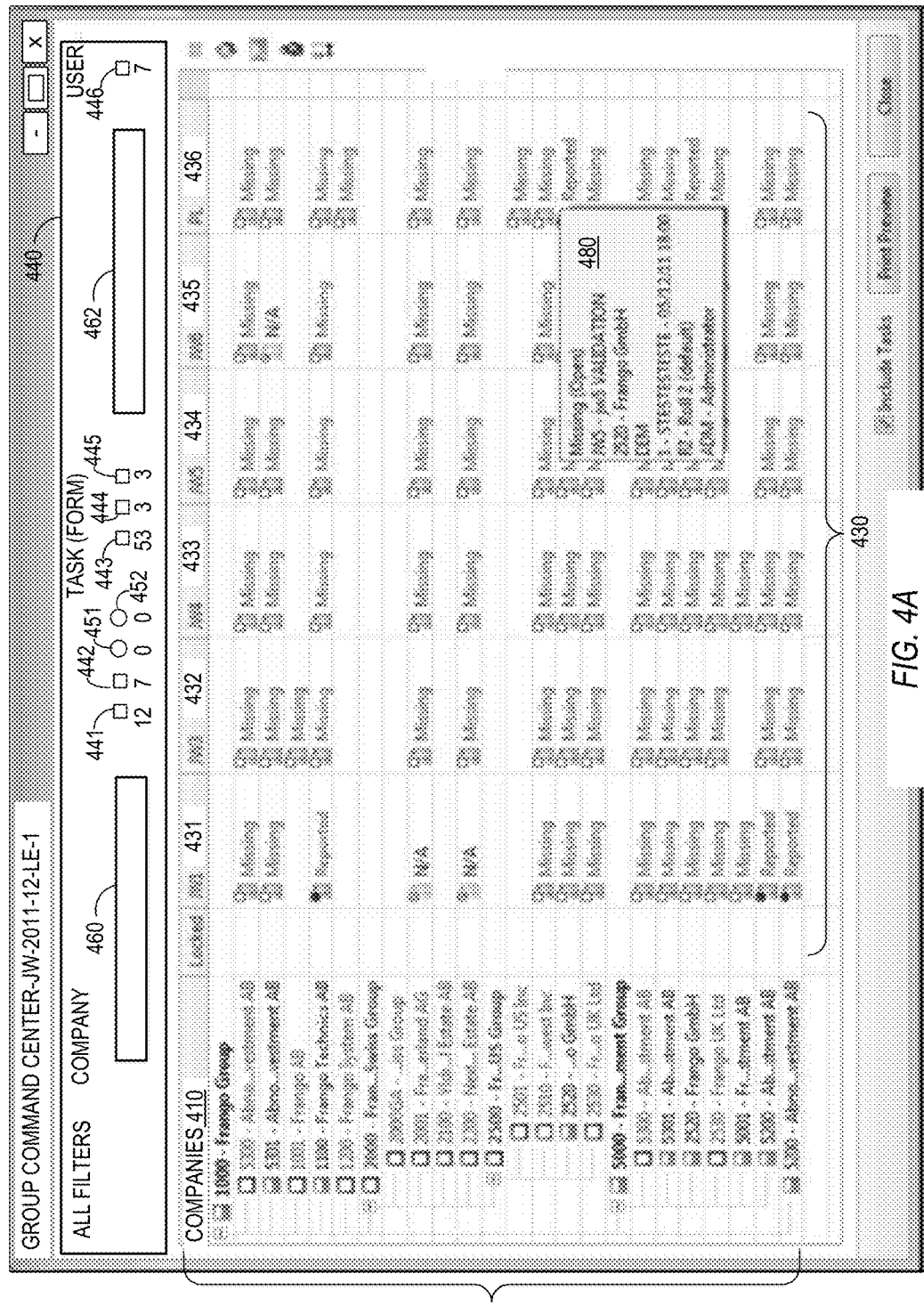
FIGS. 4A and 4B are exemplary group views of companies reporting to a parent company, according to one or more embodiments of the invention.
Figure 4B:
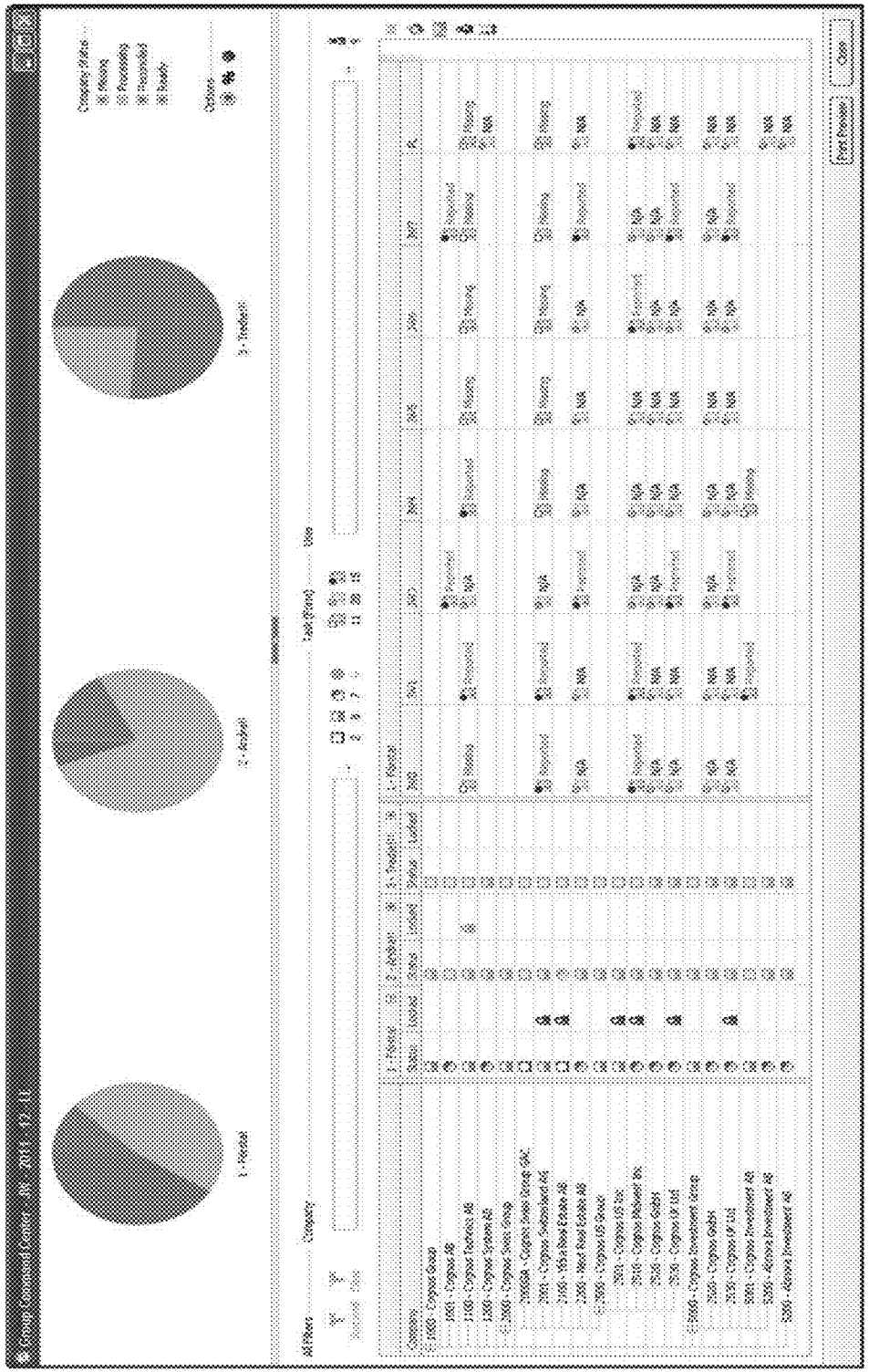
Figure 5:
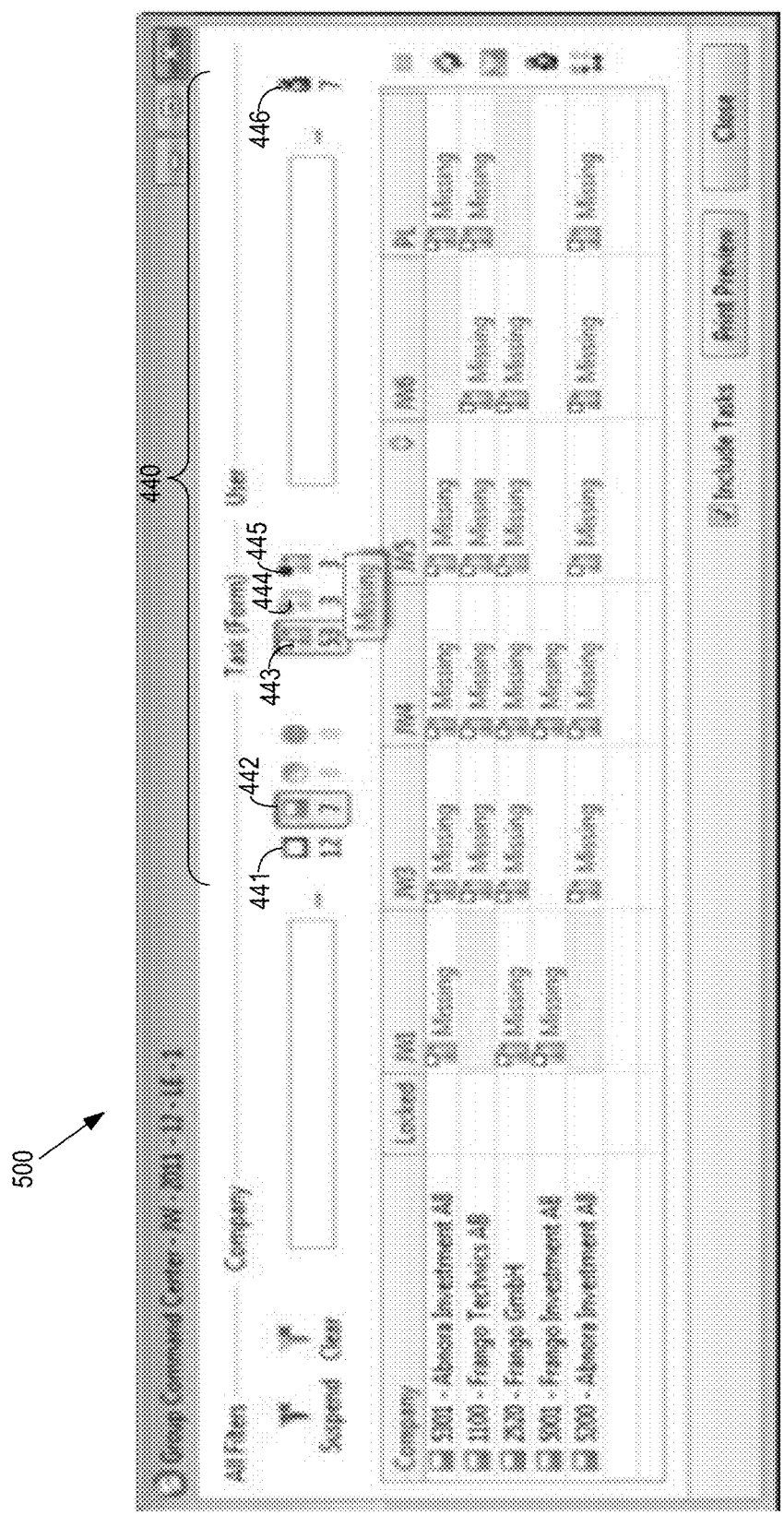
FIG. 5 is an exemplary view showing filtering, according to one or more embodiments of the invention.

With reference now to FIG. 5, in the illustrated instance according to embodiments of the present invention, program 120 presents view 500, which is a version of view 400 of FIG. 4 that program 120 has updated responsive to receiving user input selecting company status filter 442, which is for selecting companies with some submissions missing, but not all, i.e., status "in progress" and task status filter 443, which is for selecting tasks that have not been started, i.e., with status "Missing". The resulting view shows companies where the submission process is in progress, but where some tasks have not yet been started. In this example view 500, program 120 received input when current user moved a mouse cursor over task filter 443 in filter area 440 causing program 120 to present the name of status ("Missing") for filter 443, as shown.

Figure 6:
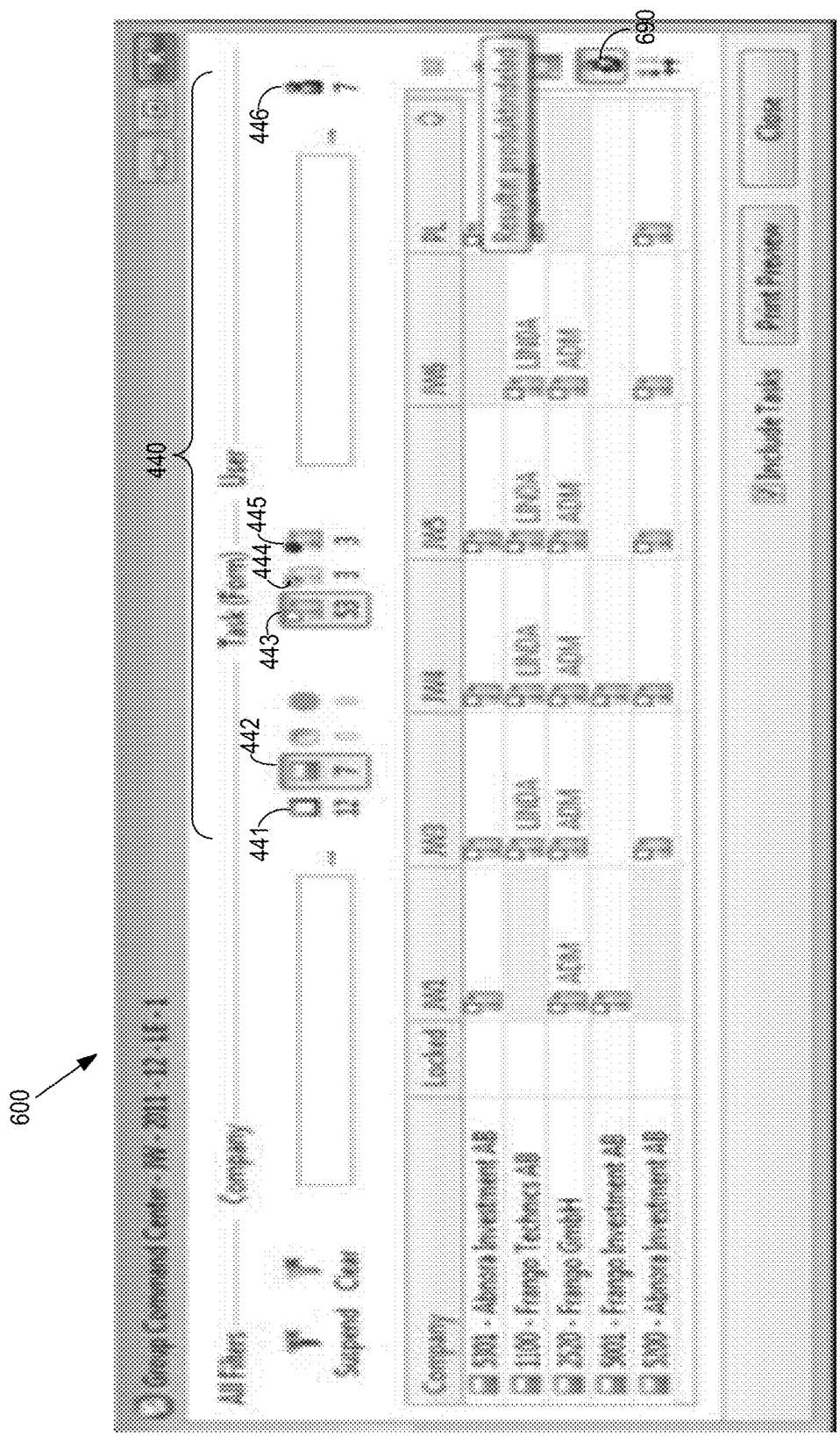
FIG. 6 is an exemplary view showing alternative perspectives of the filtered view, according to one or more embodiments of the invention.

With reference now to FIG. 6, in the illustrated instance according to embodiments of the present invention, program 120 presents view 600 after receiving the same user filter section 440 input as indicated for FIG. 5, but in this view

600, program 120 has also received input wherein the current user selected user name button 690, so that program 120 responsively presents user identifiers (e.g., names or initials) beside icons for those task icons to which a person responsibility has been assigned. Regarding the task icons that do not have user identifiers (i.e., person identifier) shown in view 600, those identifiers are missing because no user has yet been assigned responsibility for those tasks. Note that in view 600 the word "missing" is omitted beside the task icons, which is without loss of information, as previously mentioned, since the unique icons convey the "in progress" status all by themselves. Note also that view 600 shows that the user has moved a mouse cursor or other such tooltip over the right-most task column header "PL," causing program 120 to present the full name of the task, namely "Resultat produktindelad," which means "Results by Product" in English.

In FIGS. 5 and 6, the buttons "Suspend" and "Clear" (in group "All Filters") are enabled since some filter is applied. "Suspend" is a toggle that temporarily suspends all filters. When "Suspend" is first clicked, all filter buttons are disabled and the unfiltered view (FIG. 4) is shown. When clicked again, all the filter buttons become enabled, and the filters are applied again, just as they were before they were suspended. "Clear" is a push button that clears all filters. That is, all selected filter buttons are released, and all text queries in query boxes are cleared, and the unfiltered view (FIG. 4) is shown.

Figure 7:
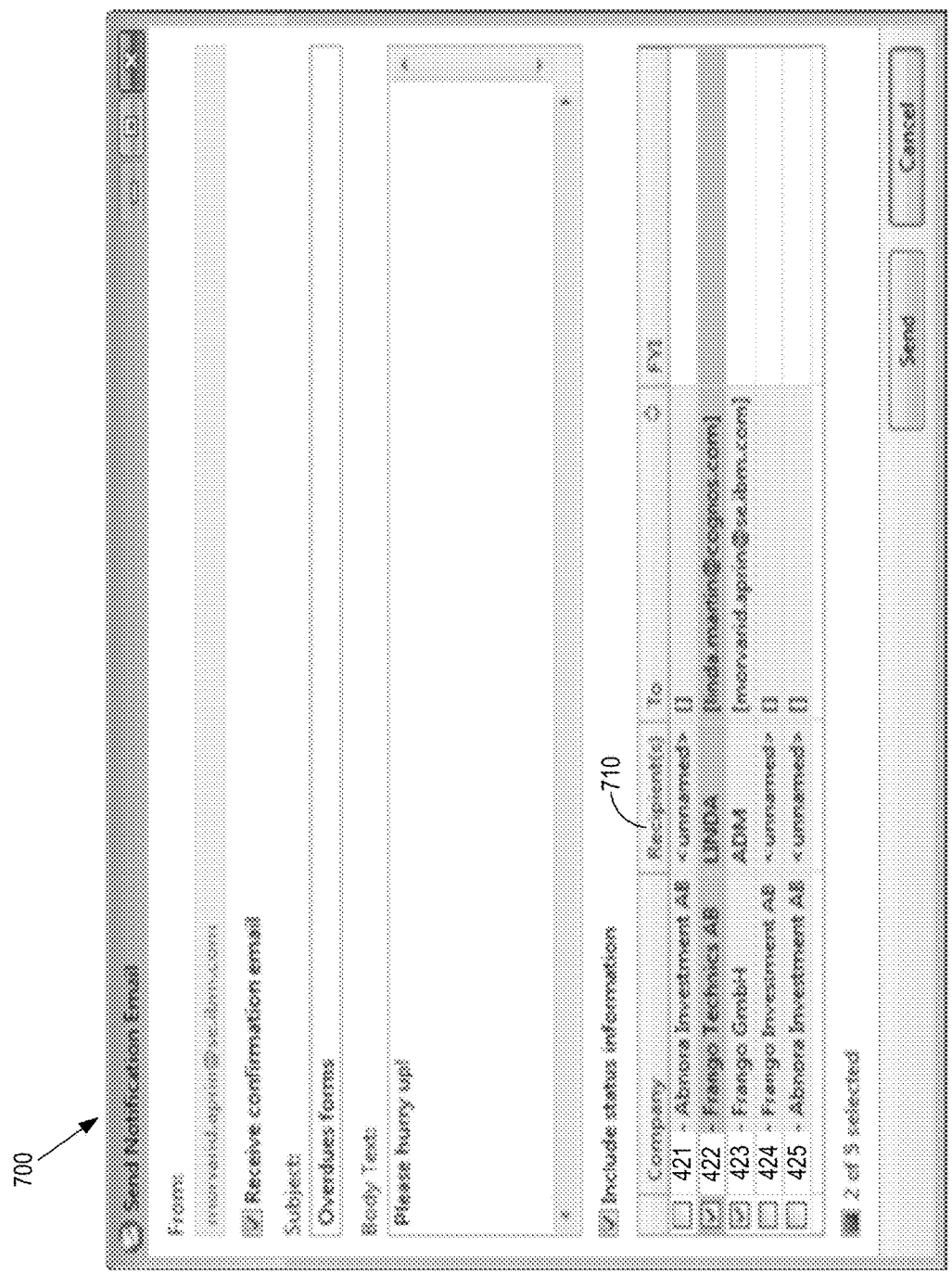
FIG. 7 is an action view showing email generation to users, according to one or more embodiments of the invention.

FIG. 7 illustrates a view 700, according to embodiments of the present invention, in which program 120 presents a "Send Notification Email" view 700 after receiving user input selecting the "notification" button 690 in view 600 to which filter 442 and filter 443 had been applied. In this example, program 120 presents view 700 for user input to initiate sending email to responsible users 710 for the five listed companies 5200, 1100, 2520, 5001, and 5301. In this example view 700, after receiving further user input (selection of companies 1100 and 2520 via check boxes, input of email subject and body text in the provided text entry boxes, and activation of "send" button) program 120 generates an email to remind all selected users 710 that time is running out. As can be seen in column 710, a responsible user has not been assigned to all tasks at all companies. It will not be possible to send email to these, but the user can manually enter an arbitrary email address in the FYI column.

Figure 8A:
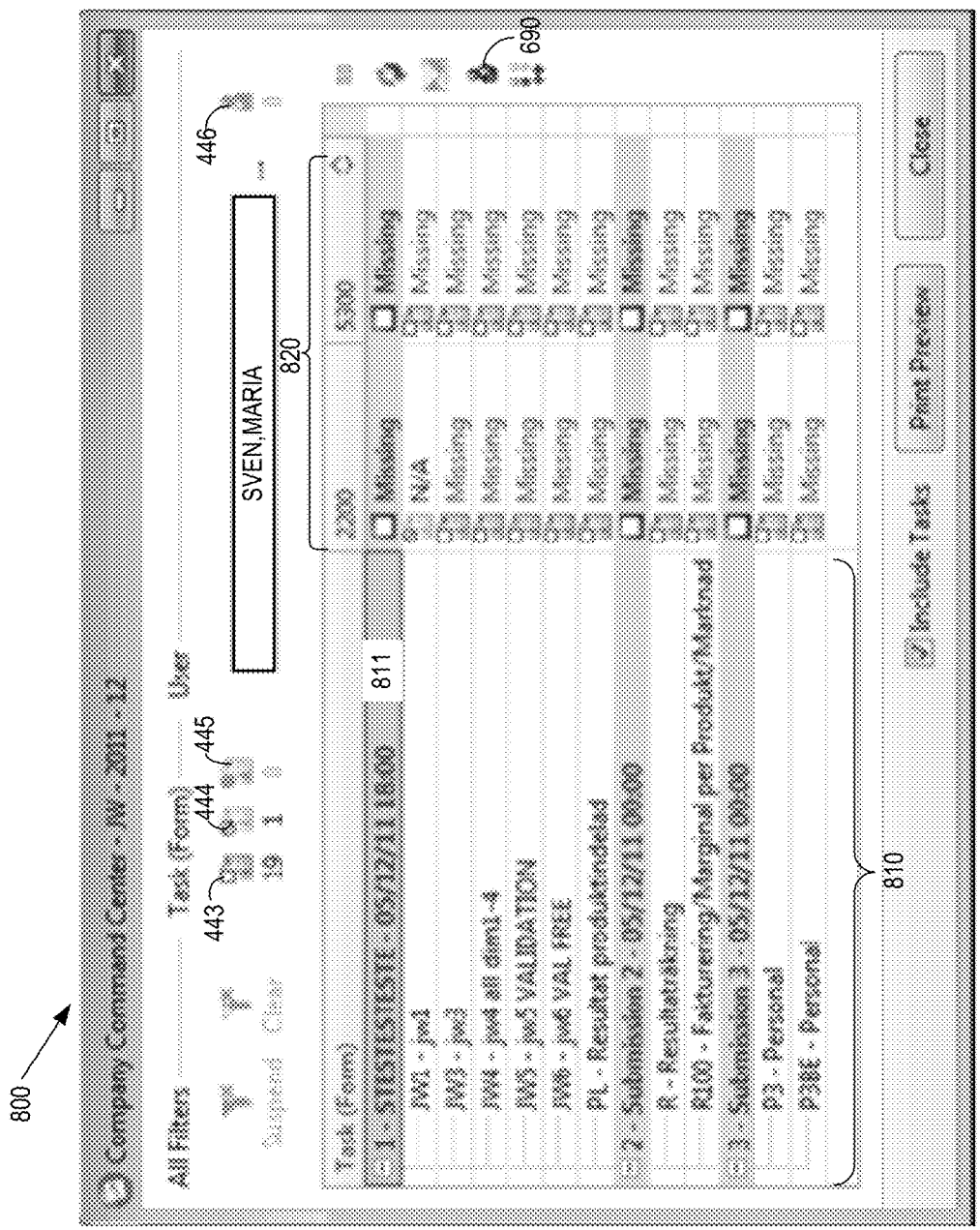
FIG. 8A is an exemplary company view showing tasks for two companies, according to one or more embodiments of the invention.
Figure 8B:
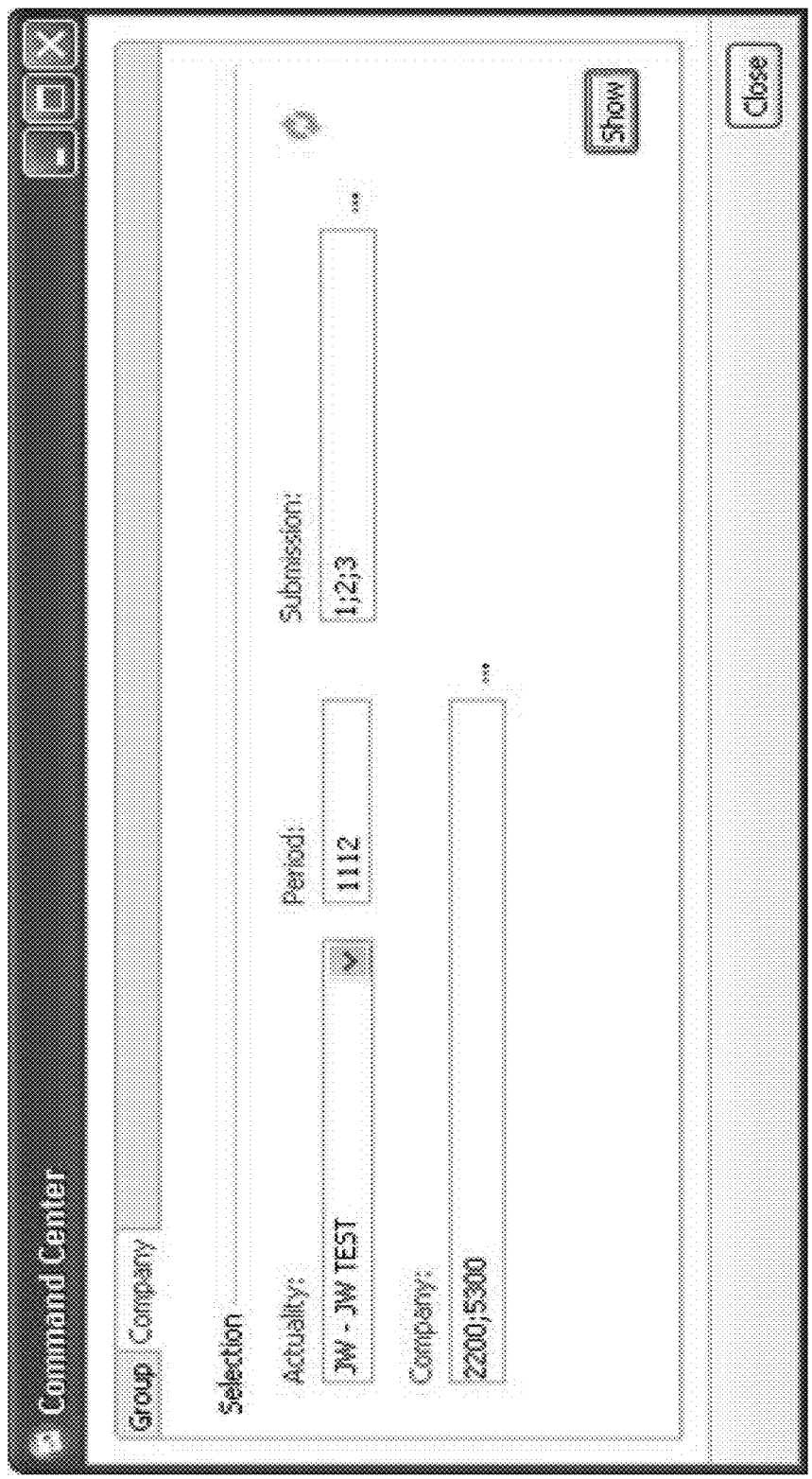
FIG. 8B is an exemplary view showing tabs for selecting whether to see company view or group view, according to one or more embodiments of the invention.

With reference now to FIG. 8A, program 120 presents a company view 800, which is an alternative to the group view 400 shown in FIG. 4A, according to embodiments of the present invention. FIG. 8B shows a view presented by program 120 from which the user can select parameters and from which the user may select company view 800 of FIG. 8A or group view 400 of FIG. 4A, for example. Whereas view 400 is oriented towards the corporate headquarters with the objective to provide a comprehensive e overview of all companies, view 800 is oriented towards individual companies that report numbers to parent groups. This view shows several Submissions with tasks in the submissions in column 811, a small subset of companies in columns 820 and the status for each task in cells of columns 820 (cross section of company and task in a submission). In view 800, program 120 presents task names JW1, JW2 . . . PL, R, R100, P3 and P3BE in rows with full task names and grouped by submissions (with full name and deadline) for selected companies, with the company names 2200 and 5300 shown in column headers. The tasks in the illustrated instance are associated with submissions as indicated and, therefore, presented in respective groups, labeled "Stesteste," "Submission 2," and "Submission 3." Submissions are optional, but are frequently used with major companies. Each submission can be thought of as a "milestone" with an associated date for which the tasks (forms/journals/ . . . ) of the submission must be completed in order to finish the next set of tasks (submission) on time. (Under submission 2, "Resultaträkning means "PL" (Profit and Loss Statement) and "Fakturering/Marginal" means "Sales/Margin per Product/Market.")

Program 120 presents the particular tasks shown in view 800 responsive to user input to user query box 462. That is, the user has entered names "Sven" and "Maria," causing program 120 to present only the tasks for which those two users are responsible.

In view 800, program 120 presents respective task status icons and status description words in the respective cells at the intersections of the task rows and company columns, which is in a fashion like that of view 400 and FIG. 4. In view 800, program 120 also presents task filter button 443 showing that there are 19 tasks with status "Missing," task filter button 444, showing that there is 1 "N/A" task, and task filter button 445 showing that there no "Reported" tasks.

Figure 9:
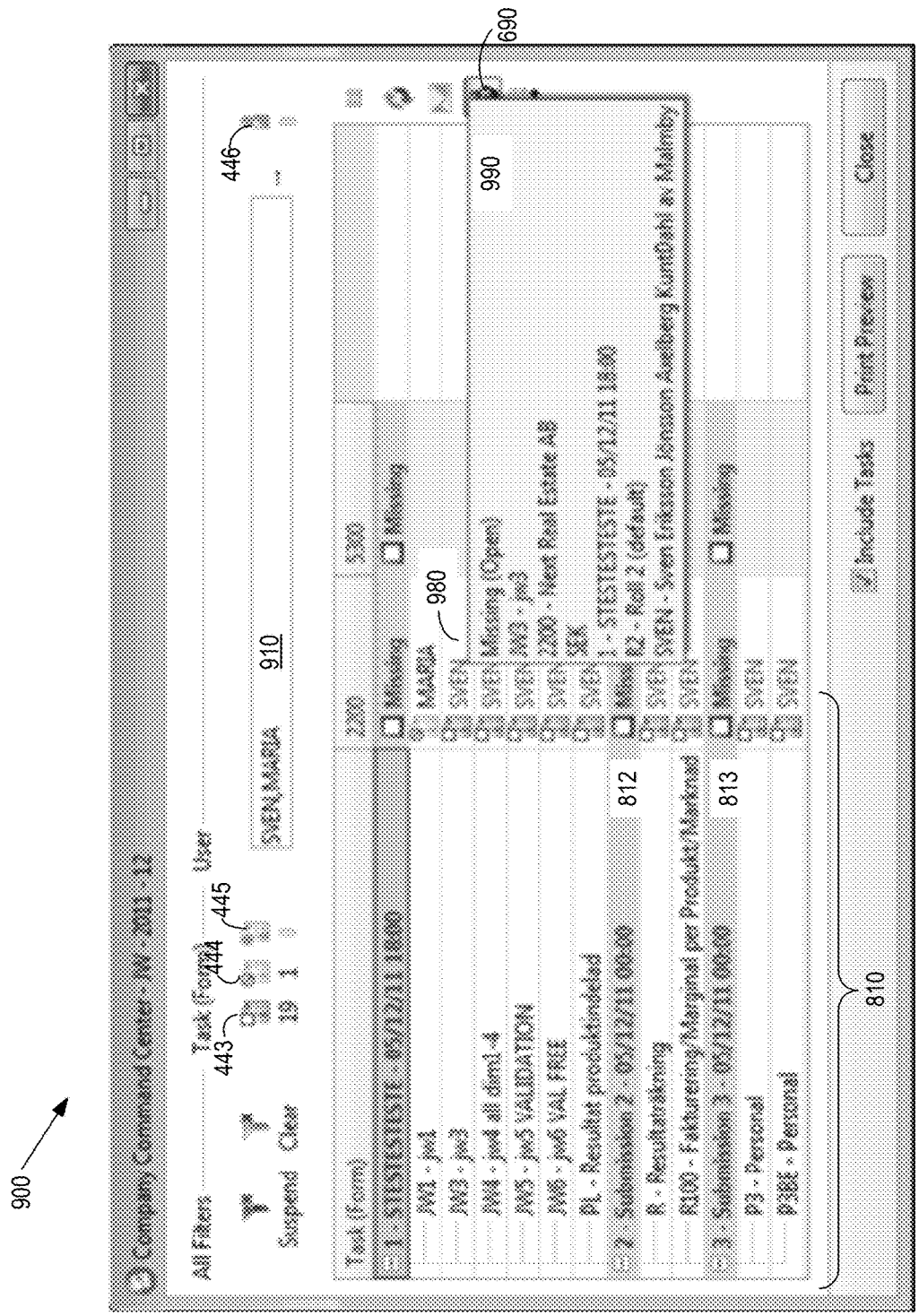
FIG. 9 is a variation of a view of like that of FIG. 8, according to one or more embodiments of the invention.

With reference now to FIG. 9, program 120 presents view 900, which is the same company view as view 800 of FIG. 8A, except that in view 900 the user has also selected the user name button 690, so that the respective name of each responsible user, i.e., Sven or Maria, is shown beside each respective task icon instead of the task's status word description. In both FIGS. 8A and 8B, the "My Tasks" button 446 is disabled, since the current user is not responsible for any tasks shown in the view. In this example, program 120 receives additional input when current user moves a mouse cursor or other such tooltip over cell 980 causing program 120 to present more detail as depicted in element 990, including full name of responsible users. In the illustrated example, the details depicted include the following:

"Missing (Open)" shows that the task status is "Missing" and that the company (2200) is not locked, in which case users can execute the task and thus update both task status and company status.

"JW3—jw3" is the full name of a task

"2200—Next Real Estate AB" is the full name of a company (including short code and human readable name).

SEK is the local currency of the company (2200).

"1—STESTETETET" indicates the full name (a made up name in this instance, which is for the purpose of illustration) of the indicated submission #1. The entry also includes a deadline when all tasks in the submission must be completed.

"R2—Roll 2 (default)" indicates the role of a user who is assigned to perform this task, where "(default)" indicates that a user having an assigned "role 2" within the company is the default role for this company, such that all tasks without a specific role assigned will be assigned to this default role. Role 2 may be, for example, the company controller.

"SVEN—Sven Eriksson Jönsson Axelberg . . . " is the short code and full name of a user assigned to role R2 at company 2200. (The user name is exaggerated for testing purposes in the illustrated instance, to make sure that the popup handles long names. But it could be a real name.)

Referring now to FIG. 4B, another embodiment of view 400 is shown in which program 120 presents overviews of multiple submissions labeled "Forstal," "Andra," and "Tredje" in respective overview columns with collective status of task icons for the submissions indicated in each row for each company or group. Tasks are shown collectively and hidden individually in the three overview columns. That is, program 120 presents view 400 in FIG. 4B with collapsible overview column groups, where each group represents a submission. All the tasks, i.e., JW0, JW1, JW3-JW7 and PL, are individually shown in columns on the right for the "Forstal" submission, since the user has selected to expand that column by clicking on the +/− box at the top of the "Forstal" overview column, as shown. Program 120 also presents a "progress indicator" above the column headers, filters and query boxes, which is in order to show overall status. In this embodiment, program 120 presents respective pie charts for respective submissions, which indicate the proportion of tasks that are in respective status categories, i.e., proportion of companies with task status missing/in progress/reconciled/ready).

Figure 10:
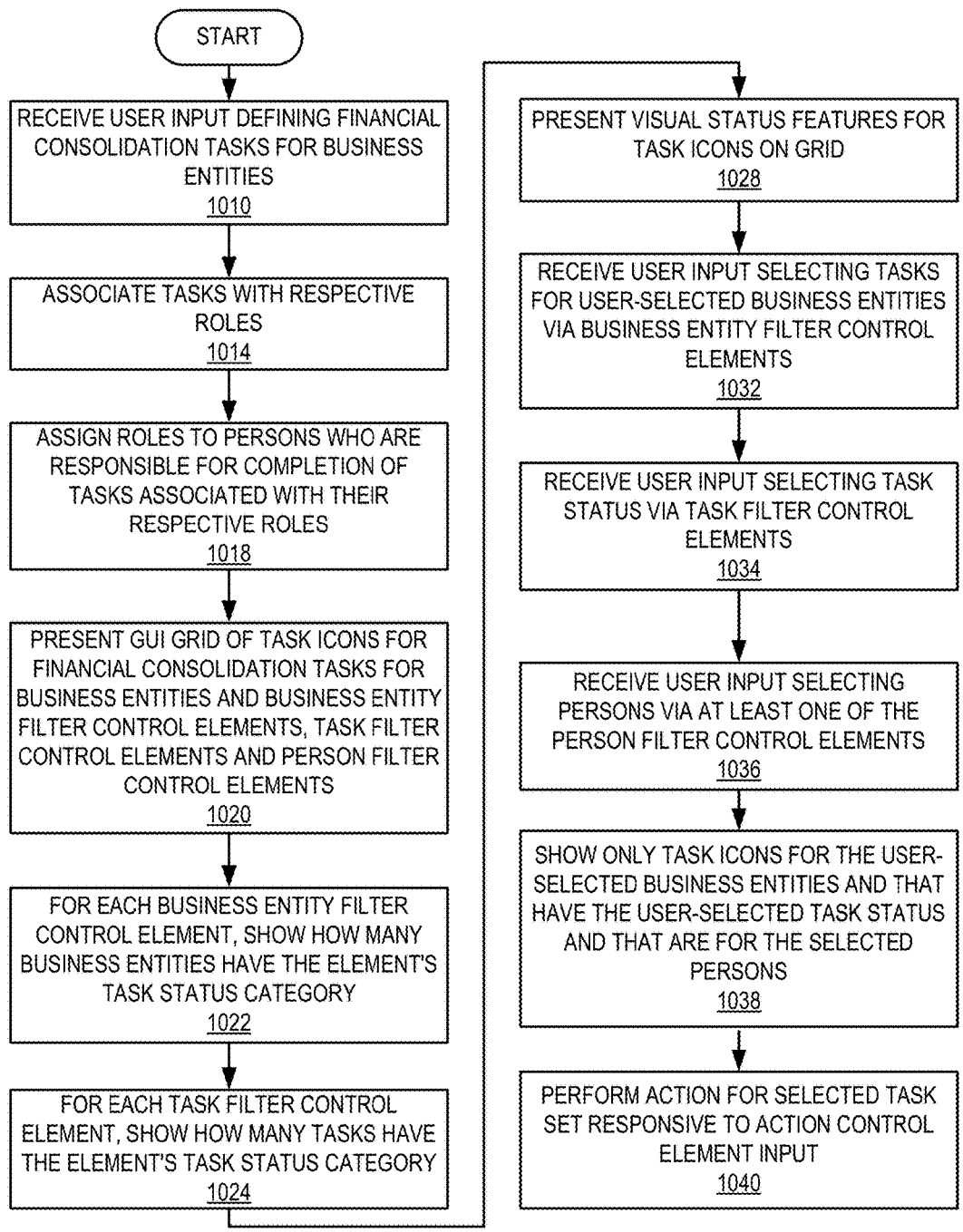
FIG. 10 is an exemplary flowchart illustrating processes, according to one or more embodiments of the invention.

With reference now to FIG. 10, a flowchart is depicted in which embodiments of the invention may be implemented. At 1010, a program receives user input by defining financial consolidation tasks for business entities. At 1014, tasks are associated with respective roles. At 1018, roles are assigned to persons who are responsible for completion of tasks associated with their respective roles.

At 1020, a GUI for the program presents a grid of task icons for financial consolidation tasks for business entities and presents business entity filter control elements, task filter control elements and person filter control elements. At 1022, for each business entity filter control element, the program shows how many business entities have the element's task status category. At 1024, for each task filter control element, the program shows how many tasks have the element's task status category. At 1028, the program presents visual status features for task icons on the grid.

At 1030, the program shows person identification with task icons responsive to person identifier control element input. At 1032, the program receives user input selecting tasks for user-selected business entities via business entity filter control elements. At 1034, the program receives user input selecting task status via task filter control elements. At 1036, the program receives user input selecting persons via at least one of the person filter control elements. At 1038, the program shows only task icons for the user-selected business entities and that have the user-selected task status and that are for the selected persons. At 1040, the program performs actions for selected task set responsive to action control element input.

Embodiments of the present invention minimize data presented by program 120 to a user. Much information is provided when program 120 receives input from a user moving a mouse over a filter, cell, or column header, causing program 120 to present additional information to the user.

Embodiments of the invention concern managing consolidation processes such as submitting, receiving and tracking status and expediting submission of inputs to consolidated financial statements, as well as computing the consolidated statements based on the input. The inputs include submissions, which may include journals, balance sheets, profit and loss statements, cash flow statements and the like for business entities and which are processed to produce consolidated financial statements that may include consolidated journals, balance sheets, profit and loss statements and cash flow statements for one or more groups of the business entities. Presentation of the status of submissions may expose submission progress including start and completion of submissions and may include options to restart or investigate processing steps that do not complete on time.

Regarding restarting, when all companies have reported their numbers (forms, journals), a reviewing, group level user locks the companies to prevent further changes and runs a reconciliation report. Discrepancies are often found and must be corrected, in which case the process must be "restarted." This includes unlocking the concerned company and entering corrected numbers thru existing tasks (forms or journals). The companies are then locked again and a new reconciliation report is produced. This cycle is repeated at each group level until numbers are within acceptable tolerance limits. Regarding investigating, if a company's tasks in a submission are not completed before a submission deadline, a group level user (at the group that consumes the failing companies numbers) can see this in the Command Center, i.e., view 400 of FIG. 4, for example, and can check the status of the individual tasks and also contact the responsible user to ask (investigate) the reasons, such as via email, as shown herein above in FIG. 7.

Embodiments of the invention include a user interface and information processing that provides users ways to monitor status and to take necessary actions to expedite completion of consolidated financial statements. If a consolidation process fails to complete because an input such as a journal is missing, automatic adjustments are not properly configured, or automatic journal adjustments fail for some reason, embodiments of the invention present information in a manner that focuses the user's attention to the problem. For example, in FIG. 4, if task JW3 represents an automatic journal that has not been run, the user's attention is drawn to the icon and status for concerned companies showing that the task has not been completed (status for task is "Missing").

Embodiments of the invention include steps for currency conversion (also known as currency translation), giving a user ways to monitor steps in the consolidation process and options to take necessary actions. If the consolidation process does not complete, such as because currency rates are not properly configured, or because currency data is unavailable for some reason, embodiments of the invention present incomplete task status in a manner that focuses the user's attention to the problem.

For an authorized user (who has necessary permissions), embodiments of the invention offer shortcuts to open relevant dialogs and take necessary actions, such as provided by filtering to select responsible parties (i.e., "users," also referred to as "data providers") for submissions according to status categories, wherein context-based menu entry is provided for sending emails to users selected thereby.

As will be appreciated by one skilled in the art, aspects of embodiments of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system comprising:
   at least one computing processor; and
   a computer-readable storage media connected to the at least one computing processor, wherein the computer-readable storage media has stored thereon a program for a financial consolidation process controlling the at least one computing processor, and wherein the at least one computing processor is operative with the program to execute the program to:
   receive user input defining financial consolidation tasks for business entities, associating the tasks with respective roles and assigning the roles to persons who are responsible for completion of tasks associated with their respective roles;
   present a graphical user interface providing control elements and task icons representing the financial consolidation tasks for the business entities, including presenting a view having the business entities along a business entity axis and the tasks along a task axis in a grid, where a respective one of the tasks for a respective one of the business entities is presented as a respective task icon at an intersection of the respective business entity on the business entity axis and the respective task on the task axis, and including presenting a visual feature of each task icon indicating status of each task icon's respective task, wherein each task icon status presented in the view includes receipt status of a financial consolidation submission for the icon's respective task so that the status of submissions is presented efficiently to the user; and
   show in the same view, responsive to receiving a user selection of one of the task icons, an identification for a person assigned to the task of the selected task icon, wherein the status and person identification in the view enables the user to efficiently identify and contact assigned persons for expediting completion of missing submissions.

2. The system of claim 1 wherein the at least one computing processor is operative with the program to execute the program to:
   show only a selected set of the task icons responsive to receiving a user input from a filter control element for selecting among all the tasks; and
   perform an action for the tasks of the selected set of the task icons responsive to receiving a user input from an action control element.

3. The system of claim 2 wherein performing the action includes sending communications to the persons responsible for the tasks of the selected set of the task icons.

4. The system of claim 1, wherein presenting a graphical user interface providing control elements comprises:
   showing a plurality of filter control elements for selecting among all the tasks, wherein ones of the filter control elements are business entity filter control elements and ones of the filter control elements are task filter control elements, each task filter control element being associated with a respective task status category, and wherein the at least one computing processor is operative with the program to execute the program to:
   show on the grid of task icons only a selected set of the task icons responsive to receiving user inputs from ones of the plurality of filter control elements, wherein the graphical user interface enables concurrently applying both a business entity filter control elements and a task filter control element, including receiving a user input selecting tasks associated with user-selected business entities via at least one of the business entity filter control elements and receiving a user input selecting tasks having a user-selected task status via at least one of the task filter control elements and responsively showing in the selected set of the task icons only task icons for the user-selected business entities and that have the user-selected task status.

5. The system of claim 4, wherein ones of the filter control elements are person filter control elements, and wherein showing on the grid of task icons only a selected set of the task icons responsive to receiving user inputs from ones of the plurality of filter control elements comprises:
   receiving a user input selecting tasks associated with persons via at least one of the person filter control elements and responsively showing in the selected set of the task icons only task icons for the user-selected business entities and that have the user-selected task status and that are for the selected persons.

6. The system of claim 4, wherein the at least one computing processor is operative with the program to execute the program to:
   show how many business entities have a respective task status category for each respective business entity filter control element.

7. The system of claim 4, wherein the at least one computing processor is operative with the program to execute the program to:
   show how many tasks have a respective task status category for each respective task filter control element.

8. A computer program product for a financial consolidation, the computer program product comprising:
   a computer-readable storage medium; and
   computer-readable program code embodied in the computer-readable storage medium, wherein the computer-readable program code is configured to cause at least one computing processor to:
   receive user input defining financial consolidation tasks for business entities, associating the tasks with respective roles and assigning the roles to persons who are responsible for completion of tasks associated with their respective roles;
   present a graphical user interface providing control elements and task icons representing the financial consolidation tasks for the business entities, including presenting a view having the business entities along a business entity axis and the tasks along a task axis in a grid, where a respective one of the tasks for a respective one of the business entities is presented as a respective task icon at an intersection of the respective business entity on the business entity axis and the respective task on the task axis, and including presenting a visual feature of each task icon indicating status of each task icon's respective task, wherein each task icon status presented in the view includes receipt status of a financial consolidation submission for the icon's respective task so that the status of submissions is presented efficiently to the user; and
   show in the same view, responsive to receiving a user selection of one of the task icons, an identification for a person assigned to the task of the selected task icon, wherein the status and person identification in the view enables the user to efficiently identify and contact assigned persons for expediting completion of missing submissions.

9. The computer program product of claim 8, wherein the computer-readable program code is configured to cause at least one computing processor to:
   show only a selected set of the task icons responsive to receiving a user input from a filter control element for selecting among all the tasks; and
   perform an action for the tasks of the selected set of the task icons responsive to receiving a user input from an action control element.

10. The computer program product of claim 9 wherein performing the action includes sending communications to the persons responsible for the tasks of the selected set of the task icons.

11. The computer program product of claim 8, wherein presenting a graphical user interface providing control elements comprises:
   showing a plurality of filter control elements for selecting among all the tasks, wherein ones of the filter control elements are business entity filter control elements and ones of the filter control elements are task filter control elements, each task filter control element being associated with a respective task status category, and wherein the computer-readable program code is configured to cause at least one computing processor to:
   show on the grid of task icons only a selected set of the task icons responsive to receiving user inputs from ones of the plurality of filter control elements, wherein the graphical user interface enables concurrently applying both a business entity filter control elements and a task filter control element, including receiving a user input selecting tasks associated with user-selected business entities via at least one of the business entity filter control elements and receiving a user input selecting tasks having a user-selected task status via at least one of the task filter control elements and responsively showing in the selected set of the task icons only task icons for the user-selected business entities and that have the user-selected task status.

12. The computer program product of claim 11, wherein ones of the filter control elements are person filter control elements, and wherein showing on the grid of task icons only a selected set of the task icons responsive to receiving user inputs from ones of the plurality of filter control elements comprises:
receiving a user input selecting tasks associated with persons via at least one of the person filter control elements and responsively showing in the selected set of the task icons only task icons for the user-selected business entities and that have the user-selected task status and that are for the selected persons.

13. The computer program product of claim 11, wherein the computer-readable program code is configured to cause at least one computing processor to:
show how many business entities have a respective task status category for each respective business entity filter control element.

14. The computer program product of claim 11, wherein the computer-readable program code is configured to cause at least one computing processor to:
show how many tasks have a respective task status category for each respective task filter control element.

15. A method for a financial consolidation process, the method comprising:
receiving user input defining financial consolidation tasks for business entities, associating the tasks with respective roles and assigning the roles to persons who are responsible for completion of tasks associated with their respective roles;
presenting a graphical user interface providing control elements and task icons representing the financial consolidation tasks for the business entities, including presenting a view having the business entities along a business entity axis and the tasks along a task axis in a grid, where a respective one of the tasks for a respective one of the business entities is presented as a respective task icon at an intersection of the respective business entity on the business entity axis and the respective task on the task axis, and including presenting a visual feature of each task icon indicating status of each task icon's respective task, wherein each task icon status presented in the view includes receipt status of a financial consolidation submission for the icon's respective task so that the status of submissions is presented efficiently to the user; and
showing in the same view, responsive to receiving a user selection of one of the task icons, an identification for a person assigned to the task of the selected task icon, wherein the status and person identification in the view enables the user to efficiently identify and contact assigned persons for expediting completion of missing submissions.

16. The method of claim 15 comprising:
showing only a selected set of the task icons responsive to receiving a user input from a filter control element for selecting among all the tasks; and
performing an action for the tasks of the selected set of the task icons responsive to receiving a user input from an action control element.

17. The method of claim 16 wherein performing the action includes sending communications to the persons responsible for the tasks of the selected set of the task icons.

18. The method of claim 15, wherein presenting a graphical user interface providing control elements comprises:
showing a plurality of filter control elements for selecting among all the tasks, wherein ones of the filter control elements are business entity filter control elements and ones of the filter control elements are task filter control elements, each task filter control element being associated with a respective task status category, and , and wherein the method comprises:
showing on the grid of task icons only a selected set of the task icons responsive to receiving user inputs from ones of the plurality of filter control elements, wherein the graphical user interface enables concurrently applying both a business entity filter control elements and a task filter control element, including receiving a user input selecting tasks associated with user-selected business entities via at least one of the business entity filter control elements and receiving a user input selecting tasks having a user-selected task status via at least one of the task filter control elements and responsively showing in the selected set of the task icons only task icons for the user-selected business entities and that have the user-selected task status.

19. The method of claim 18, wherein ones of the filter control elements are person filter control elements, and wherein showing on the grid of task icons only a selected set of the task icons responsive to receiving user inputs from ones of the plurality of filter control elements comprises:
receiving a user input selecting tasks associated with persons via at least one of the person filter control elements and responsively showing in the selected set of the task icons only task icons for the user-selected business entities and that have the user-selected task status and that are for the selected persons.

20. The method of claim 18, comprising:
showing how many business entities have a respective task status category for each respective business entity filter control element.

* * * * *